United States Patent [19]

Ziperovich

[11] Patent Number: 5,459,679
[45] Date of Patent: Oct. 17, 1995

[54] REAL-TIME DC OFFSET CONTROL AND ASSOCIATED METHOD

[75] Inventor: Pablo A. Ziperovich, San Jose, Calif.

[73] Assignee: Quantum Corporation, Milpitas, Calif.

[21] Appl. No.: 276,817

[22] Filed: Jul. 18, 1994

[51] Int. Cl.⁶ ........................................ G06J 1/00
[52] U.S. Cl. ........................................... 364/602
[58] Field of Search ........................ 364/602, 605, 364/724.01, 724.17

[56] References Cited

U.S. PATENT DOCUMENTS

| | | | |
|---|---|---|---|
| 5,241,702 | 8/1993 | Dent | 455/296 |
| 5,258,933 | 11/1993 | Johnson et al. | 364/602 |
| 5,341,249 | 8/1994 | Abbott et al. | 360/46 |
| 5,341,387 | 8/1994 | Nguyen | 364/602 |

OTHER PUBLICATIONS

National Semiconductor Corp., *Mass Storage Handbook*, 1989 Ed., pp. iii, iv, 9–28 through 9–33.
Schmerbeck, Richetta, Smith, "A 27 MHz Mixed Analog/Digital Magnetic Recording Channel DSP Using Partial Response Signalling with Maximum Likelihood Detection", *Proc. IEEE Int'l Solid State Circuits Conf.*, 1991, Paper TPM 8.3.

*Primary Examiner*—Tan V. Mai
*Attorney, Agent, or Firm*—David B. Harrison

[57] ABSTRACT

An apparatus and method for removing direct current (DC) offset from a received analog signal having DC offset introduced during analog signal processing. The preferred circuit has a DC offset control loop that is enabled and operates in real-time during the reading of a sinusoidal preamble pattern. The control loop rapidly cancels DC offset by subtracting a learned correction value from the incoming analog signal being processed. Before end of preamble playback the loop is disabled and the learned correction value held during data read times. The DC offset control loop is not dependent upon correct sampling phase decisions in order to properly determine the DC offset correction value, and it is orthogonal with respect to the gain and timing control loops in a sampled data system thereby minimizing cross-talk or other interference between the several control loops.

30 Claims, 6 Drawing Sheets

REAL-TIME DC OFFSET CONTROL AND ASSOCIATED METHOD

CROSS REFERENCE TO RELATED APPLICATION

This application is related to commonly assigned U.S. application Ser. No. 07/937,064, filed Aug. 27, 1992, entitled, Disk Drive Using PRML Class IV Sampling Data Detection with Digital Adaptive Qualization, now U.S. Pat. No. 5,341,249, the disclosure of which is hereby incorporated by reference in its entirety as if fully set forth herein.

FIELD OF THE INVENTION

The present invention pertains generally to the field of signal processing methods and apparatus for conditioning analog signals representative of digital data received from a transmission medium. More particularly, the present invention pertains to a signal processing method and apparatus for cancelling in real-time, DC offset introduced into a received analog signal.

BACKGROUND OF THE INVENTION

In digital data transmission and storage systems, digital data becomes converted into an analog signal representation incident to being sent through an analog transmission medium, such as the airwaves in the case of radio frequency communications, or a magnetic storage medium in the case of magnetic storage systems, for example. At the receiving end, the received analog signal typically must undergo some form of analog signal processing, such as amplification, and wave shaping or equalization, to facilitate the digital data recovery process.

It is typically during this signal conditioning process at the receiving end that direct current (DC) offset is introduced into the received analog signal. DC offset may be caused by the fact that analog signal processing circuitry, such as amplifiers, and filters, for example, are not ideal devices, and have an inherent amount of DC offset associated with their response characteristics. Further, the DC offset of these devices is usually not uniform, and varies as a function of temperature, integrated circuit process, signal gain, etc. The DC offset associated with these non-ideal devices manifests itself as a shift in the signal level of the analog waveform which, when uncorrected, can degrade the performance of the digital data recovery process.

In disk drive storage systems it has been conventional to use continuous time, analog peak detection schemes to recover digital data written as a series of magnetic transitions on a recording surface of a rotating magnetic disk. Recently, sampled data detection techniques such as Partial Response ("PR") signalling and Maximum Likelihood ("ML") sequence detection (collectively "PRML") have been employed in magnetic recording systems. An example of a PRML data channel architecture is illustrated in commonly assigned, U.S. patent application Ser. No. 07/937,064.

Typical PRML data channels have ML detectors that determine the data based on an analysis of samples taken from the received analog waveform, rather than just one peak point as is the case with peak detection techniques. In a sampled data system using a PRML channel, the incoming analog waveform is sampled and quantized using an analog to digital ("A/D") converter at predetermined proper sampling times. Thus, the clock to the A/D converter is synchronized and phase aligned to the incoming data to sample at the proper time. To this end, PRML channels typically employ a timing loop to rapidly acquire frequency and phase synchronization of the A/D converter clock with the incoming data stream. An example of an improved timing loop in a disk drive application, particularly a multi-mode analog and digital timing loop is disclosed in U.S. application Ser. No. 07/937,064. Another exemplary multi-mode timing loop is also disclosed in commonly assigned U.S. Pat. No. 5,258,933 to Johnson et al., the disclosure of which is also hereby incorporated by reference in its entirety as if fully set forth herein.

Another control loop typically utilized in the analog signal conditioning process in a PRML channel is a gain control loop. The gain control loop is used to adjust the signal amplitude of the analog data stream presented to the input of the A/D converter so as to achieve full utilization of the converter's dynamic range. An example of a rapidly acting analog and digital multi-mode gain control loop is disclosed in U.S. application Ser. No. 07/937,064.

Shifts in the incoming analog signal level attributable to DC offset may affect the acquisition of the gain and timing control loops, resulting in a degradation of the quality of the channel. Another problem typically caused by DC offset is the effect it has on the gain control loop with regard to the reduction of the overall A/D converter range which can lead to signal saturation.

One known approach for cancelling DC offset is to use AC coupling between the analog circuit elements introducing DC offset and the remainder of the read channel. This technique involves employing DC blocking capacitors after the analog circuit elements introducing DC offset and thereby removing any DC component present in the analog signal. However, this approach can slow control loop response, and result in the undesirable effect of reducing signal bandwidth at low frequencies.

Another known approach for cancelling DC offset is a non-real time approach wherein the DC offset of the received analog signal is measured once during channel initialization, for example, and a correction value is applied to the channel during data reception operations based on this initial measurement. The measured correction value is typically held until the channel is re-initialized. This approach is likewise not optimal as it makes initialization time longer, and increases the drive's Random Access Memory ("RAM") requirements. Most importantly, this system does not function in real-time in that dynamic changes in DC offset occurring during data reception operations are not taken into account and therefore are not compensated for.

A variation on this latter approach, in which it is suggested that a circuit should be employed in a disk drive to remove DC offset during disk drive idle times (i.e., when the disk drive is not servicing a user request for reading or writing data), appears in an article by Schmerbeck et al., entitled, "A 27 MHz Mixed Analog/Digital Magnetic Recording Channel DSP Using Partial Response Signalling with Maximum Likelihood Detection," Paper TP 8.3, IEEE International Solid State Circuits Conference, 1991. This circuit would also not function in real-time.

A third known approach is continuous DC offset control. This approach is suboptimal since it operates continuously over the analog data stream, in the process changing the data's signal shape characteristics and introducing loop noise which degrades the signal to noise ratio of the channel. In order to compensate for the signal shape distortion to the data signal it is necessary to add a correcting block to the channel, thereby increasing system complexity, and power consumption. Additionally, it is typically not necessary to track DC offset values over the data because of the relatively slow changes in DC offset that occur over the length of a typical data sector.

Accordingly, it would be desirable to have a simple DC offset cancellation control loop that functions in real-time during data reception operations without operating over the received user data field. Another desirable aspect of such a system would be to cancel DC offset without affecting the operation of the other signal processing control loops.

SUMMARY OF THE INVENTION

A general object of the present invention is to provide a real-time system for cancelling DC offset introduced into a received analog signal during analog signal processing which overcomes the disadvantages and drawbacks of the prior art.

A general object of one aspect of the present invention is to provide a simple real-time first order control loop that learns a DC offset correction value during the reading of a preamble pattern from the recording surface of a mass storage disk, and then holds and applies the learned correction value to the incoming analog signal during data read times.

A related object of the present invention is to provide an improvement to the PRML read channel architecture disclosed in U.S. application Ser. No. 07/937,064, thereby improving the performance of that channel architecture.

A related object of one aspect of the present invention is to provide a DC offset cancellation system that does not alter the signal shape characteristics of a received data signal.

Another object of the present invention is to provide a DC offset control loop that does not require the precise alignment of the sample values taken from a preamble waveform with predetermined proper sample points on the preamble waveform.

Another object of the present invention is to provide a DC offset control loop that does not rely on decisions made on the sample values, thus improving control loop reliability under noisy channel conditions.

Another object of the present invention is to provide a DC offset control loop that operates independently of and without affecting the operation of the gain and timing control loops in a magnetic read channel.

According to the present invention, DC offset introduced into a received analog signal by analog circuit components during an analog signal processing stage is substantially cancelled or removed by a real-time DC offset control loop. The control loop cancels DC offset during processing of a sinusoidal signal received from an analog communication medium. In a preferred embodiment the DC offset control loop is enabled and rapidly acquires a DC offset cancellation value during the reading of a constant frequency (within a selected data zone) sinusoidal preamble pattern within a preamble field which preferably occurs at the beginning of every user data segment in a blocked data transfer or storage system.

A preferred control loop adds digitized preamble sample values that are taken one-half preamble period apart to generate a DC offset error value. This offset error value is multiplied by a factor having a value of less than one (<1) to smooth loop response; converted to an analog signal representation; fed back to a summing junction at the loop input; and subtracted from the incoming analog signal. The samples taken one-half period apart in a preferred preamble pattern are opposite in polarity and of equal value in the absence of DC offset. Thus, when added, any resultant value will be attributable to twice the DC offset value.

A preferred DC offset control loop accumulates or integrates DC offset error over a plurality of loop iterations until the loop response is preferably stabilized (by proper choice of a loop multiplier) some time before the end of preamble playback. The presently preferred loop is then disabled and the stabilized offset correction value accumulated or learned as of that time is held and thereafter continuously subtracted from the incoming analog data signal over data read times. The correction value is preferably held until the next preamble time when it is learned once again.

An added advantage of the preferred DC offset control loop is that it is particularly robust and immune from precise timing requirements. Another added feature is that the DC offset cancellation loop is orthogonal with respect to the gain, and timing loops in the read channel. This means that each of the three loops (the gain, timing and DC offset) operates independently of the other without interaction.

In another aspect of the present invention, an inventive method is provided for removing DC offset from a received analog signal. A preferred method disclosed comprises the steps of:

(a) inputting a received analog signal having a known frequency portion and a data portion into a DC offset control loop;

(b) sampling the received analog signal during reception of the known frequency portion and based on the samples taken determining a series of intermediate DC offset correction values;

(c) applying intermediate DC offset correction values to the received analog signal until the DC offset control loop has learned an appropriate DC offset correction value;

(d) holding the learned DC offset correction value; and (e) subtracting the held DC offset correction value from the analog signal during reception of the data portion of the signal.

These and other aspects, features, objects and advantages of the present invention will be more fully understood and appreciated upon consideration of the following detailed description of a preferred embodiment of the invention, presented in conjunction with the accompanying drawings.

DETAILED DESCRIPTION OF THE PREFERRED EMBODIMENT

While the present invention is disclosed in terms of digital data storage and retrieval devices, such as a disk drive data storage system, those skilled in the art will appreciate that the present invention may be effectively embodied in any system for communicating analog signals where DC offset introduced into a received analog signal during signal processing adversely affects channel performance.

PRML Read Channel Environment

Figure 1:
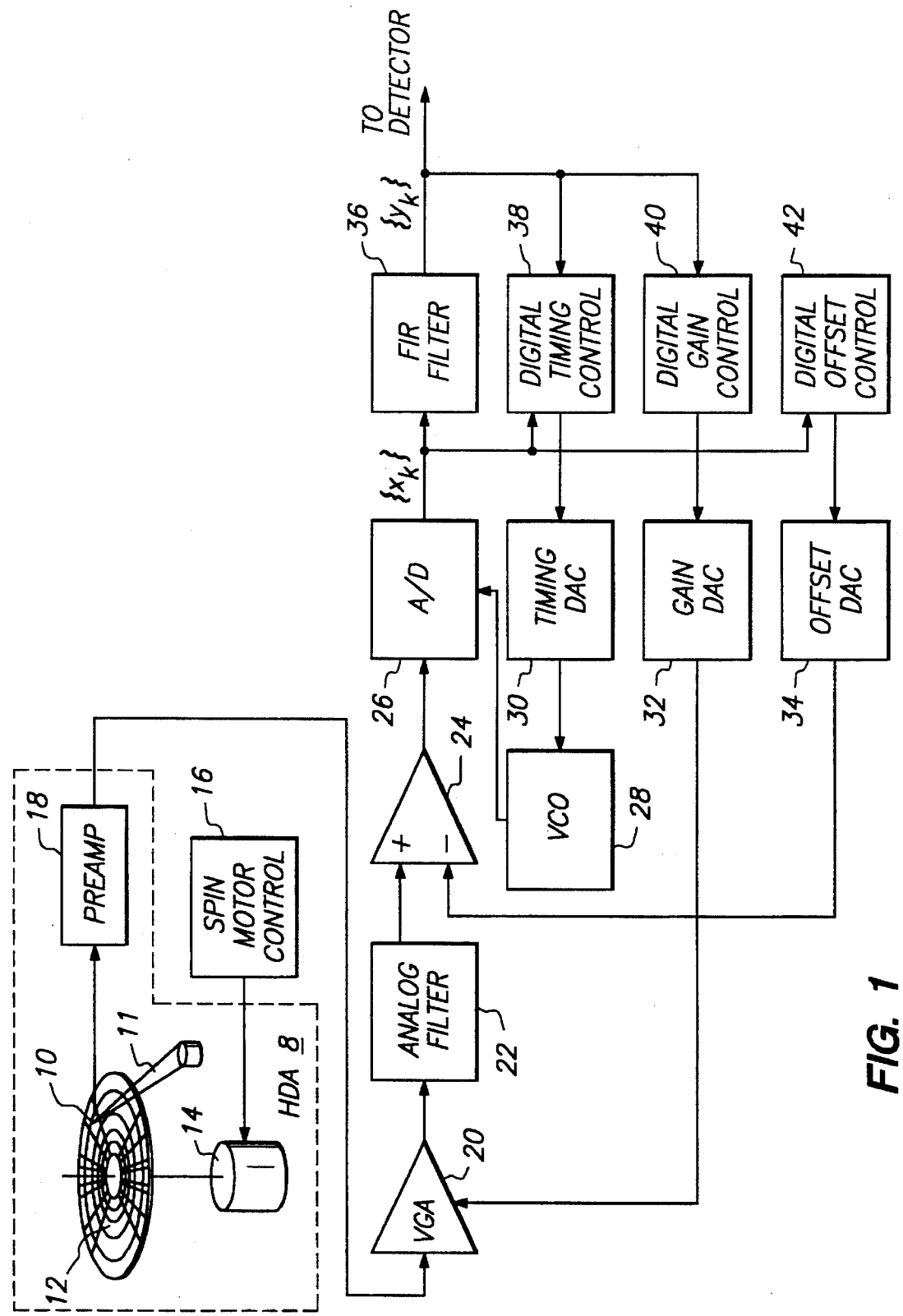
FIG. 1 is a block diagram of a disk drive PRML read channel incorporating a DC offset control loop of the present invention.

Referring now to FIG. 1, an exemplary and presently preferred disk drive PRML read channel embodying a DC offset control loop in accordance with the present invention is illustrated. While the present invention is described herein in the context of a PRML read channel, it will be apparent to those of skill in the art after reading this specification that the invention is equally applicable to read channels employing traditional peak detection schemes.

In the illustrated disk drive example, a head disk assembly ("HDA") 8 includes at least one data storage disk 12, rotated at a constant angular velocity by a speed regulated spindle motor 14 controlled by a spindle motor control circuit 16. The HDA further includes at least one read/write transducer head 10 positioned in close proximity to a recording surface of the disk 12 by an actuator arm assembly 11; and a preamplifier circuit 18 to provide initial amplification of the output signal from the head 10. During operation, i.e., when the disk 12 is rotating, the head 10 is supported by an air bearing surface in "flying" relationship over the recording surface of the disk 12 as is conventional. The preamplifier circuit 18 is preferably located in close proximity to the head 10 to reduce noise pickup.

The HDA 8 may follow a wide variety of embodiments and sizes. One example of a suitable HDA is described in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Still another HDA arrangement is described in commonly assigned, copending U.S. patent application Ser. No. 07/881,678, filed May 12, 1992, entitled "Hard Disk Drive Architecture." The disclosures of these patents and this application are incorporated by reference herein in their entirety as if fully set forth herein.

During a reading or retrieval process user data and overhead information (previously written or stored as a series of magnetic transitions around a plurality of concentrically spaced recording tracks during a recording process) is "read" from the recording surface of a selected data track of the rotating disk 12 by a head 10. The head 10 "reads" the stored magnetic transitions by generating a small analog output signal representative of the strength and direction of the magnetic flux from the transitions impinging on the head 10 as the disk 12 is rotated under the head 10.

In a preferred embodiment, before being sent to the read channel the small analog head output signal receives an initial signal boost from the constant gain preamplifier circuit 18. The preamplified analog output from the head (the "read signal") is transmitted to a read channel where it is amplified by a variable gain amplifier ("VGA") 20 and then equalized or filtered by analog filter 22. The filter 22 is preferably a programmable analog filter-equalizer such as the 7th order low pass filter with two programmable opposing zeros added for high frequency boost disclosed in U.S. application Ser. No. 07/937,064, for example. In the presently preferred zoned recording arrangement illustrated in the referenced application, the filter/equalizer 22 is preferably programmed to be optimized for the data transfer rate of the selected radial zone of concentric data tracks from within which the head 10 is reading data.

After undergoing controlled amplification by VGA 20 and analog equalization by filter 22 the read signal passes through summing junction 24 (the function of which will be described more fully below) and into A/D converter 26. The A/D converter 26 is preferably a six bit resolution "flash" A/D converter of the type disclosed in U.S. application Ser. No. 07/937,064. The A/D converter 26 samples the incoming analog data stream and quantizes it into raw data samples $\{x_k\}$ according to the number of bits resolved by the particular A/D architecture. The quantized raw data samples $\{x_k\}$ are passed through filter 36, where they are transformed into conditioned data samples $\{y_k\}$ before being sent to a detector, such as a Viterbi detector, for example. Filter 36 is preferably an adaptive digital finite impulse response ("FIR") filter of the type disclosed in U.S. application Ser. No. 07/937,064.

Figure 3A:
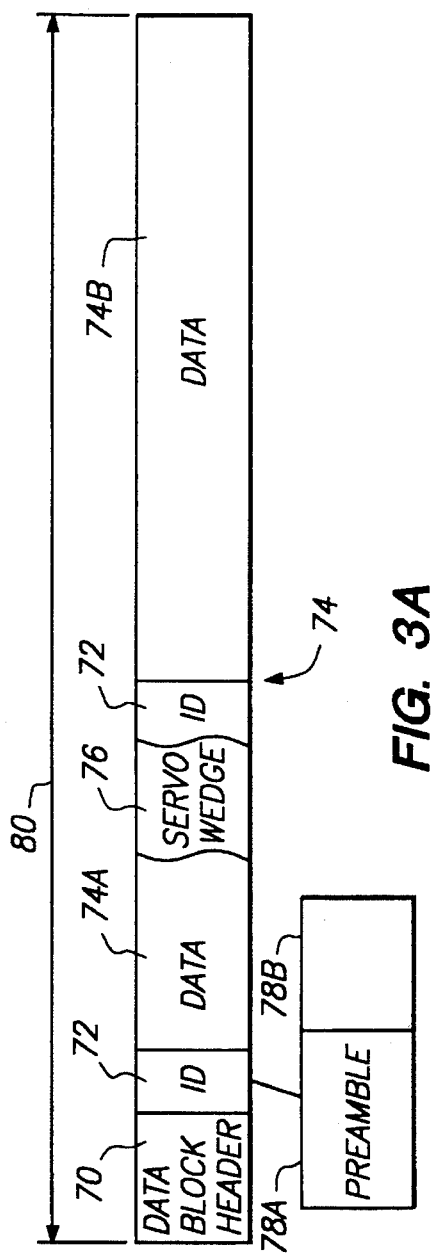
FIG. 3A is a diagram of a recording pattern formed on a data storage surface of a magnetic storage disk in a blocked data storage system.

Referring now to FIG. 3A, a presently preferred data recording pattern for a data block storage and transfer system employing zoned data recording techniques is illustrated. A data block 80 written on a data track of the recording disk 12 may include certain overhead information such as a data block header field 80, a data ID field 72, and a user data block 74. In the presently preferred zoned recording arrangement illustrated in U.S. application Ser. No. 07/937,064, embedded servo sector or "wedge" fields 76 may interrupt the user data block 74, breaking it up into user data segments of various sizes, such as 74A and 74B.

A predetermined amount of user data, such as 512 or 1024 bytes, for example, may be stored in user data block 74. User data block 74 may also include a predetermined number of error correction code ("ECC") check bytes, and cross check ("XC") bytes, appended to the user data. Servo wedge field 76 includes servo burst information to maintain proper head position over the selected data recording track in a conventional manner not pertinent to the present invention.

Figure 3B:
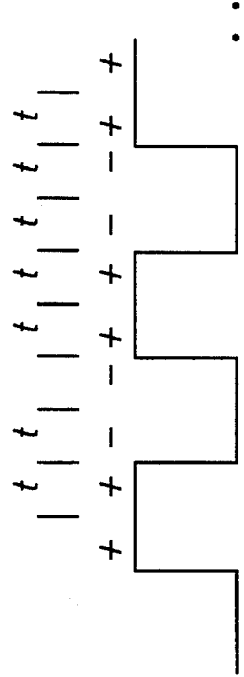
FIG. 3B is a graph illustrating the write current used to record a preferred preamble pattern.

Every recorded user data segment, e.g., 74A and 74B, of data block 74 is preceded by a data ID field 72. In a preferred embodiment data each ID field 72 includes a preamble field 78A (such as an AGC field) and a sync field pattern 78B. The preferred preamble field 78A comprises a sinusoidal ¼T preamble pattern recorded in accordance with a square wave saturated recording current as illustrated in FIG. 3B, and may be nine bytes long, for example.

The sync field pattern 78B is preferably provided immediately following the preamble pattern 78A. As more fully explained in U.S. patent application Ser. No. 07/937,064, the sync pattern serves as a unique address mark for synchronization of a byte clock to the user data field 74 immediately following the data ID field 72. The byte clock is provided to a serializer/deserializer (not shown) which frames user data bytes from the incoming stream of serial bits being read back from the disk.

When PRML user data is to be read from the surface of the disk 12 a logic signal, such as RDGATE, supplied to the read channel electronics in any conventional fashion, is asserted true. The RDGATE signal informs the read channel that read mode has been enabled and that user data is soon to be read. During read mode, the gain, timing and DC offset control loops illustrated in FIG. 1 control the process of correctly transforming the incoming analog data stream into properly quantized sample values $\{x_k\}$.

Figure 3C:
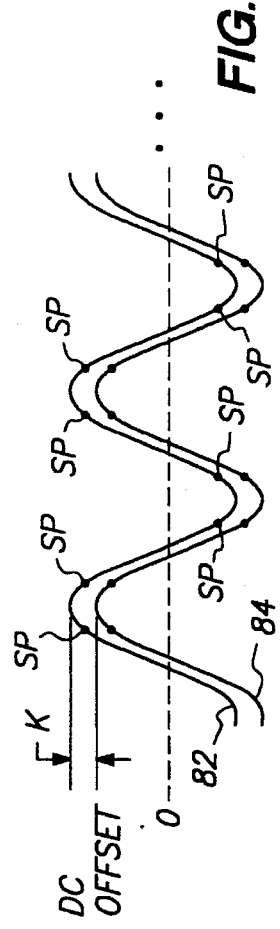
FIG. 3C is a graph illustrating the readback signal from a constant frequency burst preamble field in an analog signal format.

Read mode is preferably broken down into two submodes, acquisition and tracking. Acquisition mode corresponds with playback of the preamble field 78A, and tracking mode preferably occurs after acquisition mode when user data segments, e.g., 74A and 74B are to be read. During acquisition mode or preamble playback, the head 10 processes the detected flux transitions such that playback resembles a sinewave 82 as shown in FIG. 3C. The analog preamble playback waveform is preferably sampled by the PRML read channel (as indicated at sample points (SP) in FIG. 3C) at a rate of four times the frequency of the preamble. Thus, one period of the playback waveform preferably comprises four bits or clock periods. It should be noted that in the presently preferred zoned data recording architecture the bit period, and thus the sampling rate varies from recording zone to recording zone with the rate being greatest at the radially outermost zone.

The playback response of the preamble pattern 78A in the preferred application is used for several purposes. One such purpose is to lock up the timing loop to an appropriate initial starting phase, and to synchronize the A/D converter 26 clock to the data pattern to be read. The preamble pattern 78A is also used to set the initial gain settings as is conventional with AGC fields such that when the conditioned data samples $\{y_k\}$ leave the FIR filter 36, a nominal ternary (i.e., three level) pattern is present. As will be described below, the preferred DC offset control loop disclosed herein also uses the preamble pattern 78A to learn an appropriate DC offset correction value during acquisition mode.

Referring back to FIG. 1, the operation of the gain and timing loops will now be briefly described. The amount of gain applied to the incoming read signal by the VGA 20 is controlled by the multi-mode gain loop illustrated in FIG. 1. The gain loop adjusts the amplitude of the analog read signal presented at the input of the A/D converter 26 to fully utilize the dynamic range of the A/D converter 26, thus providing enhanced sample resolution. As previously discussed, DC offset degrades gain loop acquisition, and alters the read signal envelope at the input of the A/D converter 26.

When read mode is enabled (as signaled by RDGATE asserted true), the gain of the VGA 20 is controlled by a digital gain control loop comprised of digital to analog converter ("DAC") 32, and digital gain control circuit 40. When the disk drive is in non-read mode gain is controlled by an analog gain loop as more fully disclosed in U.S. patent application Ser. No. 07/937,064.

During read mode, the digital gain control circuit looks at conditioned samples $\{y_k\}$ taken from filter 36 and determines appropriate adjustments in signal gain as required. The gain adjustment signal from the control circuit 40 is then sent to gain DAC 32 where it is converted into an analog signal for controlling the gain of VGA 20.

The multi-mode timing loop illustrated in FIG. 1 is utilized to rapidly acquire frequency and phase alignment of the timing signal to the A/D converter 26 with the incoming data stream. The timing loop is comprised of a digital timing control circuit 38, timing DAC 30, and voltage controlled oscillator ("VCO") 28. When read mode is entered the timing loop first operates in acquisition mode to rapidly synchronize the A/D converter 26 clock as supplied by VCO 28 to the incoming analog signal stream.

During acquisition mode the head 10 supplies a signal read from the preamble field 78A on the disk 12 to A/D converter 26 where it is quantized into sample values $\{x_k\}$. The digital timing control circuit 38 takes preamble sample values $\{x_k\}$ and determines appropriate timing adjustments to be supplied to VCO 28 through timing DAC 30. When tracking mode is entered the digital timing control circuit 38 determines appropriate timing adjustments based on conditioned data samples $\{y_k\}$ from FIR filter 36. The timing adjustment signal from the digital timing control circuit 38 is then converted into an analog signal by timing DAC 30 and supplied to VCO 28 to control the A/D converter 26 clock.

For a more detailed description of the gain, and timing acquisition loops in an exemplary PRML read channel the reader is referred to U.S. application Ser. No. 07/937,064.

DC Offset Control Loop

Figure 2:
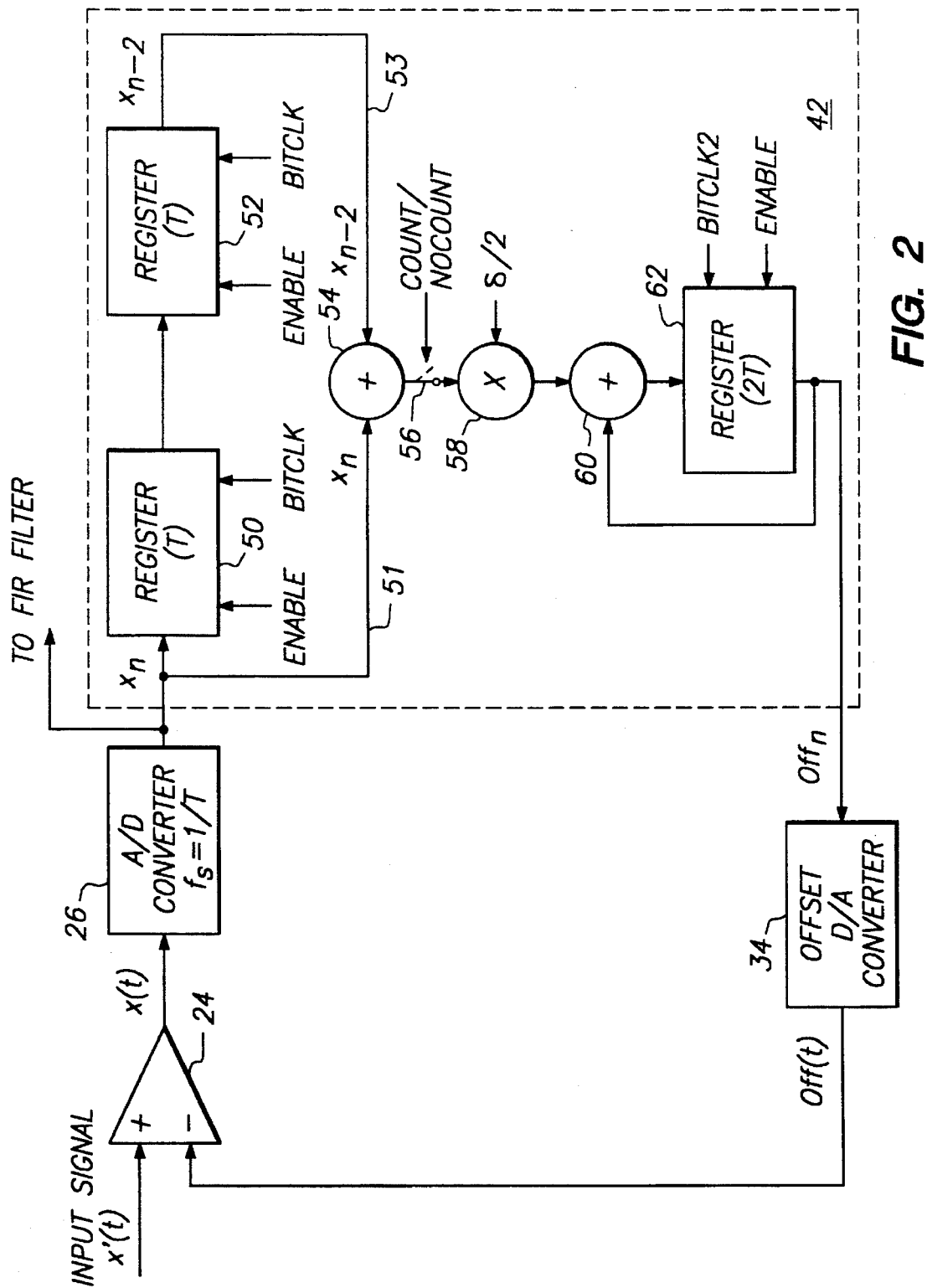
FIG. 2 is a functional block diagram of a preferred DC offset control loop of the present invention.

As illustrated in FIGS. 1 and 2, a DC offset control loop according to the invention comprises a digital offset control circuit 42, an offset DAC 34 and a summing junction 24. The loop is a simple first order feedback loop that cancels DC offset during acquisition mode (preamble time) when RDGATE is asserted true. After learning an appropriate DC offset correction during acquisition mode, the loop is disabled by an internal counter function prior to the end of preamble playback, and the learned correction value held and applied to summing junction 24 during data read time for the associated user data segment.

A preferred control loop re-learns an appropriate correction value prior to the reading of each user data segment providing periodic compensation for dynamic changes in DC offset occurring during disk drive operations. At the end of read mode when the RDGATE signal switches states to false the held correction value may be cleared or reset to some predetermined initial condition thereby readying the control loop for the next time read mode is entered. In an equally preferred alternative embodiment, each time a user data segment is to be read and acquisition mode is entered the held correction value may be cleared (or reset to some predetermined initial condition), and the DC offset control loop re-enabled at the same time to learn an appropriate DC offset correction value for the next segment of user data.

Turning now to FIG. 2, an input signal x'(t), containing DC offset introduced by analog circuit signal processing elements such as VGA 20 and programmable filter 22, for example, is input to the positive input of summing junction 24. An example of a preamble playback waveform containing DC offset is shown in FIG. 3C, as upper waveform 82, offset in a positive direction by an amount, K, from an ideal playback waveform 84 disposed symmetrically about a horizontal zero DC voltage axis. As can be seen, DC offset causes the entire playback waveform 82 to shift relative to the zero DC voltage axis of FIG. 3C.

An analog offset adjustment signal, Off(t), (the generation of which will be described below) is supplied to the negative input of summing junction 24 in a feedback arrangement as illustrated in FIGS. 1 and 2. The summing junction 24 subtracts the offset adjustment signal Off(t) from input signal x'(t) leaving an ultimately corrected analog signal $x_c(t)$ at its output after the loop has learned a proper offset adjustment signal.

In a preferred embodiment, signal $x(t)$ is quantized into six bit digital sample values, $x_n$, by A/D converter 26 operating at a clock frequency equal to one over the bit period ($f_s=1/T$). Digital sample values, $x_n$, are sequentially clocked into serially connected memory circuits or shift registers 50 and 52 at the channel bit clock rate ("BIT-CLK"). Shift registers 50, 52 and 62 receive an enable signal from a state machine controller provided in any conventional fashion. The enable signal may be derived from the RDGATE signal to control the start of loop operations by holding the outputs of registers 50, 52, and 62 to zero value until read mode is entered. The enable signal may also be used to reset the control loop at the end of read mode when RDGATE is asserted false by clearing registers 50, 52 and 62 so that a new correction value may be learned each time read mode is entered.

Figure 4:
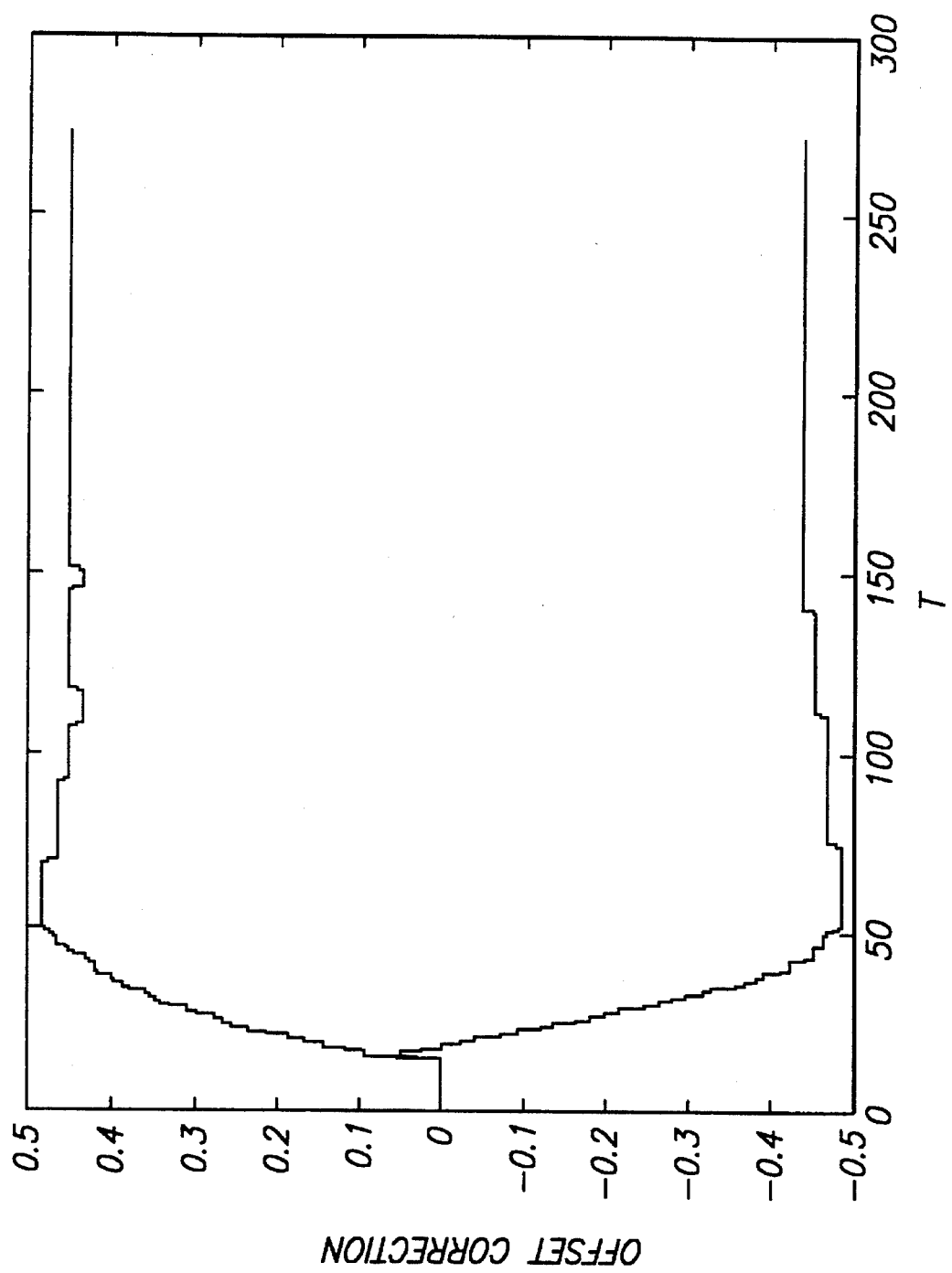
FIG. 4 is a graph of a DC offset control loop response for positive and negative DC offsets.
Figure 5:
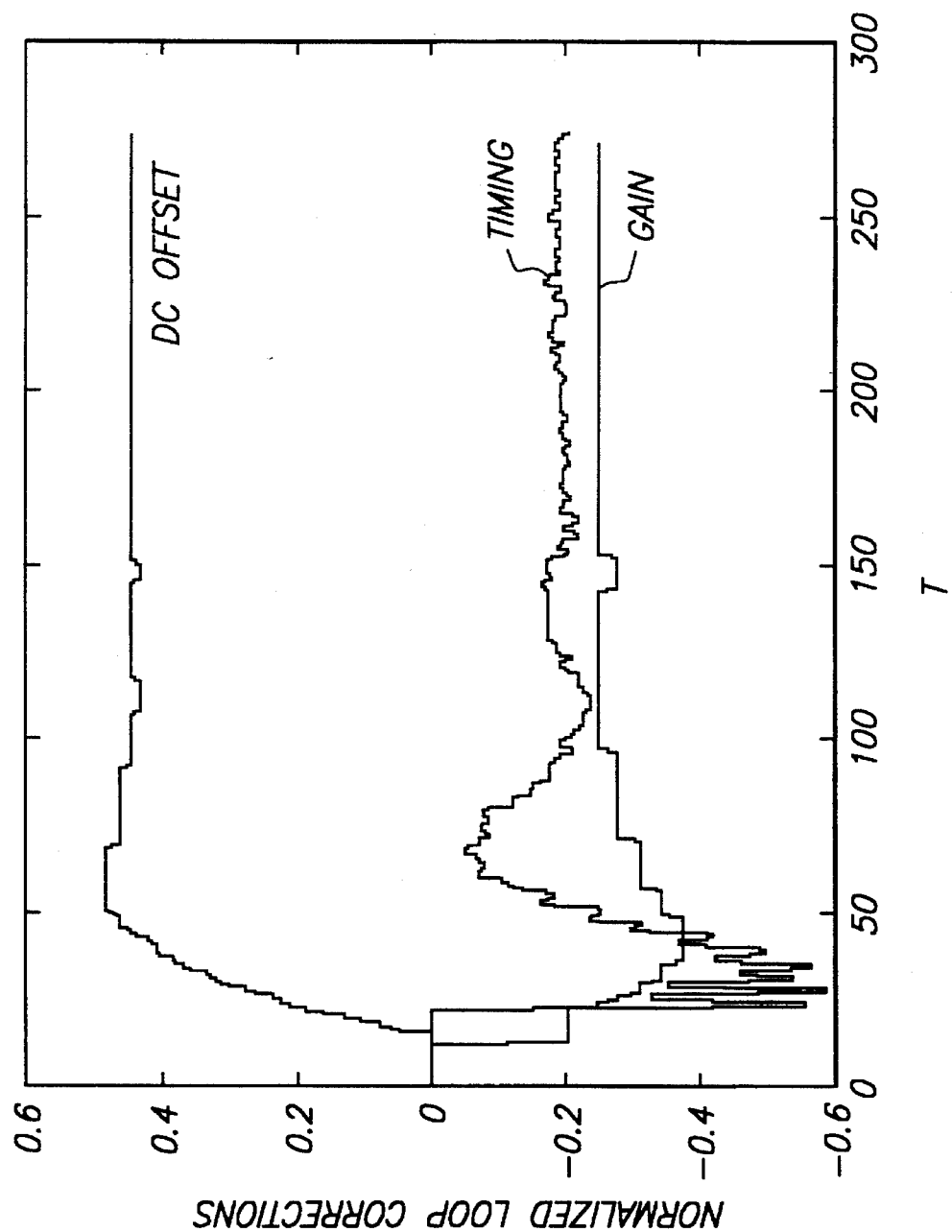
FIG. 5 is a graph illustrating the orthogonal operation of a DC offset control loop of the present invention with respect to the gain and timing loops during preamble acquisition.
Figure 6:
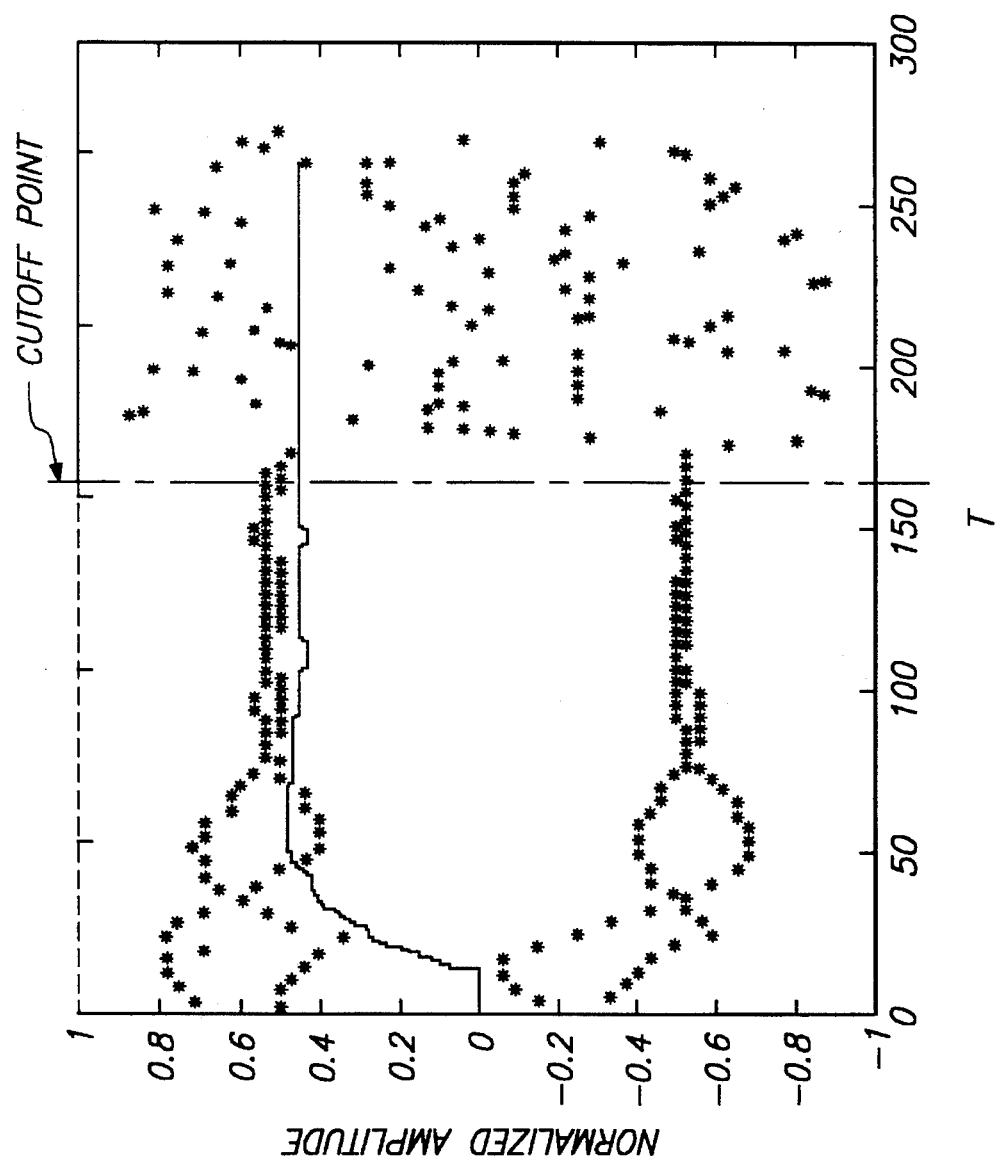
FIG. 6 is a graph of a DC offset control loop response shown with corresponding signal samples and cutoff point.

During non-read mode, e.g., disk idle mode, the enable signal is asserted false and the outputs of registers 50, 52, and 62 may be held at zero or some other initial condition. When read mode is entered, the enable signal is held false until the BITCLK signal is present and meaningful sample values are available for processing by the control loop. Once BITCLK is present the enable signal is switched to true and the loop begins processing incoming samples values. A slight delay from the beginning of preamble playback until the enable signal is asserted true is shown in FIGS. 4, 5 and 6, where loop acquisition does not begin until approximately the 20th sample value, for example.

The combination of shift registers 50 and 52 and adder 54 are utilized to add sample values, $x_n$, two bit periods apart. Every clock cycle an incoming sample value, $x_n$, is input to register 50; the previous sample value $x_{n-1}$ is output from register 50 to the input of register 52; and the next previous sample value $x_{n-2}$ is output from register 52 on line 53 to adder circuit 54. The input to shift register 50 is also connected via line 51 to adder 54, so that preamble sample values two bit periods apart are added together to obtain a DC offset error value, $\Delta o_n = x_n + x_{n-2}$.

As can be seen from FIG. 3C at constant frequency preamble burst waveform 84, sample values taken one-half preamble period apart are opposite in polarity, and in the absence of DC offset are of equal value. When such sample values are taken from a constant frequency preamble burst waveform containing DC offset, such as waveform 82, and then added together, the result of the cancellation will be twice the amount of the actual DC offset experienced by the channel. Of course, adding sample values one-half preamble period apart is equivalent to adding sample values two bit periods apart taken at sample points (SP) on the ¼T period preamble waveform shown in FIG. 3C.

One of the benefits of a preferred control loop is that it does not require precise phase alignment of the A/D converter 26 clock to the preamble waveform or precise signal amplitude to be present at the A/D converter 26 in order to work properly. This can be readily appreciated by the fact that a phase shift in the sampling points (SP) on the playback waveform still results in adding sample values one-half preamble period apart to obtain the DC offset error value (twice the actual DC offset).

The DC offset error values, $\Delta o_n$, from adder 54 are divided by two and multiplied by a constant loop gain factor, $\partial$, by multiplier circuit 58. The loop gain factor is preferably less than one (<1) to allow the loop to gradually learn an appropriate correction value and to smooth loop response.

Adder 60 is connected to the input of register 62 with the output of register 62 connected in feedback arrangement to the input of adder 60.

The combination of adder 60 and fed back shift register 62 functions as an integrator to accumulate the scaled DC offset error values, $(\partial \Delta o_n)/2$ to arrive at an accumulated offset correction value, $Off_n$. $Off_n$ is output from register 62 and converted to an analog adjustment signal $Off(t)$ by offset DAC 34, before being ultimately subtracted from the input signal $x'(t)$.

In a preferred embodiment, shift register 62 is supplied with a clock signal, BITCLK2, that is one-half the frequency of the channel bit clock signal, BITCLK, so that the scaled DC offset error values are integrated every other bit clock cycle. This strategy reduces power consumption in CMOS circuit implementations, for example, where power consumption is proportional to the clock frequency. When register 62 is clocked its current input value $Off_n$, comprised of the current scaled error value $(\partial \Delta o_n)/2$ plus the fed back previous accumulated offset correction value, $Off_{n-1}$, is sent to its output and received by the offset DAC 34. The next successive bit clock cycle the register 62 is not clocked and its output is maintained at the same value as the previous bit clock cycle. In this manner, the offset correction is updated every other bit clock cycle.

Implementation of the integrator portion of the control loop with an analog integrator circuit, such as a capacitor, for example, is also within the contemplation of the invention. In this case, the integrator function may be moved to the analog side of the loop by placing a capacitor 63 (shown in phantom in FIG. 2) connected to ground between offset DAC 34 and the negative input of summing junction 24. The DAC 34 converts the error signal at its input to an output error current which is integrated by the capacitor 63 and supplied to summing junction 24.

A preferred DC offset control loop is enabled during acquisition mode to learn an appropriate DC offset correction value. At the beginning of acquisition mode when the enable signal to shift registers 50, 52 and 62 switches states to true the state machine controller begins counting clock cycles in any conventional manner, and loop operations commence. After a predetermined programmable number of clock cycles of less than or equal to the length of the preamble, the input to the integrator section of the loop (adder 60 and shift register 62) is disabled and the accumulated correction value, $Off_n$, is held at the output of register 62 during data tracking when the associated user data segment is being read. The number of loop iterations required to learn the correction value depends on the amount of DC offset, and the choice of the loop gain factor, $\partial$, for example.

A disabling mechanism, represented in FIG. 2 by switch 56, which may in practice be an AND gate, is utilized to deactivate the integrator section of the loop after a predetermined number of bit clock cycles has been reached, so that DC offset error values no longer flow into the input of register. The switch is opened when a loop disabling signal, such as COUNT/NOCOUNT, derived from the loop counter described above, is asserted false.

The following equations describe the preferred DC offset control loop operation:

$$X_{nT} = X(t) \text{ for } t = nT$$

$$\Delta O_n = x_n + x_{n-2}$$

$$\text{Off}_n = \begin{cases} \text{Off}_{n-1} + \frac{\delta}{2} \Delta O_n & \text{for n even} \\ \text{Off}_{n-1} & \text{for n odd} \end{cases}$$

$$\text{Off}(t) = \text{Off}_n \text{ for } t = nT \text{ to } (n+1)T$$

$$x(t) = x'(t) - \text{Off}(t)$$

Where:

x(t): analog signal after offset correction;

x'(t): analog signal before offset correction;

$x_n$: digital sample value;

$\Delta o_n$: digital offset error;

n: sampling instance;

T: bit period

δ: loop gain factor;

$\text{Off}_n$: digital offset correction value; and

Off(t): analog offset adjustment signal.

The following Verilog™-XL Version 1.6B program listing describes a presently preferred hardware implementation of the DC offset control circuit 42:

```
_timescale 1 ns / 10 ps
module offset
(offsetin, offsetout, t1, bitclk, bitclk2, initn,offval,
offbypass, acqtrkn, toring);
output [6:0] offsetout;
output toring
input [5:0] offsetin;
input [1:0] t1;
input bitclk;
input initn;
input bitclk2;
input [6:0] offval;
input offbypass;
input acqtrkn;
reg [5:0] reg0,reg1,regx;
reg [9:0] reg2,reg1;
reg [6:0] reg3;
wire [5:0] a;
wire [9:0] b,b1,c,d;
wire ofp,ofn;
reg regacqtrkn;
function [9:0] barrel4;
input [9:0] sample;
input [1:0] ctl;
    case (ctl)
        2'b00: barrel4 =
{{1{sample[9]}}, sample[9:1]};
        2'b01: barrel4 =
{{2{sample[9]}}, sample[9:2]};
        2'b10: barrel4 =
{{3{sample[9]}}, sample[9:3]};
        2'b11: barrel4 =
{{4{sample[9]}}, sample[9:4]};
    endcase
endfunction
always @ (posedge bitclk or negedge initn)
    begin
    if (!initn)
        begin
            reg0 <= 6'o00;
            reg1 <= 6'o00;
            regx <= 6'o00;
        end
    else
        begin
            reg1 <= reg0;
            reg0 <= regx;
            regx <= offsetin;
        end
    end
always @ (posedge bitclk2 or negedge initn)
    begin
    if (!initn)
        begin
            regacqtrkn <= 1'b1;
        end
    end
    begin
        regacqtrkn <= acqtrkn;
    end
    end
always @ (posedge bitclk2 or negedge initn)
    begin
    if (!initn)
        begin
            regb1 = 10'h000;
            reg2 = 10'h000;
        end
    else
        begin
            regb1 <= b1;
            reg2 <= d;
        end
    end
always @ (posedge bitcl2 or negedge initn or negedge offbypass)
    begin
    if (!initn && !offbypass)
            reg3 <= 7'h00;
    else
            reg3 <= offbypass ? offval : d[9:3];
    end
assign a = regx + reg1;
assign b = barrel4 ({a 4'h0}t1);
assign b1 = b & {10{regacqtrkn}};
assign c = regb1 + reg2;
assign ofp = !regb1[9] & !reg2[9] & c[9];
assign ofn = regb1[9] & reg2[9] & !c[9];
wire overflow = ofp _ ofn;
assign d = overflow ? {ofn,{9{ofp}}} : c;
assign offsetout = reg3;
assign toring = reg0[5];
endmodule
```

FIG. 4 shows the response of a DC offset control loop according to the present invention to an initial DC offset of eight MD converter least significant bits ("LSB"). The DC offset correction of the loop is shown for both positive and negative offsets. For this particular example, the loop stabilizes at around 50 bits. As previously discussed, the amount of time it takes for the loop to stabilize, depends on the amount of DC offset, and the loop gain factor, δ, for example.

FIG. 5 shows the performance of a preferred DC offset control loop working in conjunction with exemplary gain and timing control loops in a PRML recording channel. Due to their orthogonality, all three loops can be active simultaneously. The upper graph shows DC offset, the middle graph shows the timing loop, and the lower graph shows the gain loop.

The loop response of a preferred DC offset control loop superimposed on digitized sample values $\{x_k\}$ taken from the AfD converter in a PRML read channel is shown in FIG. 6. The integrator portion of the loop is deactivated at around bit 150, as shown by the cutoff point, and its learned correction value is held constant during the data section (indicated by dispersed sample points occurring after the loop cutoff).

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of cancelling DC offset while receiving an analog signal having a known frequency portion comprising the steps of:

(a) inputting the received signal into a DC offset control loop;

(b) sampling the received analog signal during reception of the known frequency portion and based on said samples determining a series of intermediate DC offset correction values;

(c) applying said intermediate DC offset correction values to said received analog signal until said DC offset control loop has learned an appropriate DC offset correction value;

(d) holding said learned DC offset correction value; and (e) subtracting said held DC offset correction value from the analog signal during reception of the rest of the signal.

2. The method of claim 1 wherein said DC offset control loop is included within the read channel of a disk drive storage system and the received analog signal is received from a magnetic data transducer head which recovers information stored on the recording surface of a magnetic recording disk.

3. The method of claim 1 wherein the received analog signal includes a plurality of data portions and a plurality of known frequency portions, each of said known frequency portions comprising a constant frequency burst preamble, reception of each one of said plurality of data portions preceded by reception of one of said constant frequency preamble bursts.

4. The method of claim 3 wherein the steps of sampling the received analog signal and applying intermediate correction values to the received analog signal to learn an appropriate DC offset correction value occur each time an acquisition mode is entered in a disk drive storage system, said acquisition mode corresponding with reception of said constant frequency preamble burst, and said holding and subtracting steps are performed prior to the end of each acquisition mode entered into by said disk drive.

5. The method of claim 3 wherein said DC offset control loop re-learns an appropriate DC offset correction value prior to the reception of each data portion of the received analog signal.

6. The method of claim 1 wherein the known frequency portion of the received analog signal comprises a constant frequency preamble burst read from a recording surface of a magnetic recording disk, said constant frequency preamble burst being previously written on said surface of said disk as a series of magnetic transitions.

7. The method of claim 6 further comprising the steps of:

(a) quantizing the received analog signal into digital sample values taken at discrete time intervals;

(b) generating a plurality of DC offset error values by adding sample values taken one-half period apart during reception of said constant frequency preamble burst;

(c) obtaining a plurality of scaled correction values by multiplying said plurality of DC offset error values by a loop gain factor divided by two;

(d) serially inputting said plurality of scaled correction values into an integrator; and (e) integrating said serially input scaled correction values to obtain a plurality of intermediate DC offset correction values.

8. The method of claim 7 wherein said integration step is performed on every other serially input scaled correction value.

9. The method of claim 6 further comprising the steps of:

(a) quantizing the received analog signal into digital sample values taken at discrete time intervals;

(b) generating a plurality of DC offset error values by adding sample values which are opposite in sign as taken during reception of said constant frequency preamble burst;

(c) obtaining a plurality of scaled correction values by multiplying said plurality of DC offset error values by a loop gain factor divided by two;

(d) serially inputting said plurality of scaled correction values into an integrator; and (e) integrating said serially input scaled correction values to obtain a plurality of intermediate DC offset correction values.

10. The method of claim 9 wherein said integration step is performed on every other serially input scaled correction value.

11. A method of cancelling DC offset while receiving an analog signal having a periodic sinusoidal portion comprising the steps of:

(a) quantizing the received signal into digital sample values at discrete time intervals;

(b) generating a DC offset error value by adding sample values taken one-half period apart during reception of the sinusoidal preamble portion;

(c) obtaining a scaled correction value by multiplying each of said plurality of DC offset error values by a loop gain factor divided by two;

(d) inputting said scaled correction value into an accumulator for accumulating a DC offset correction value;

(e) outputting a DC offset correction value from said accumulator;

(f) converting said DC offset correction value into an analog offset adjustment signal;

(g) subtracting said analog offset adjustment signal from the received analog signal;

(h) repeating the steps of quantizing the received signal through subtracting said analog offset adjustment signal until a stabilized DC offset correction value has been obtained;

(i) holding said stabilized DC offset correction value at the output of said accumulator;

(j) repeatedly converting said DC offset correction value into an analog offset adjustment signal; and (k) subtracting said stabilized DC offset correction value from said received analog signal during reception of the rest of the signal.

12. The method of claim 11 wherein said accumulator accumulates every other serially input scaled correction value.

13. The method of claim 12 wherein an appropriate DC offset correction value is re-learned prior to the reception of each data block.

14. The method of claim 11 wherein the periodic sinusoidal portion of the received analog signal is read from a recording surface of a magnetic recording disk by a data transducer head in a disk drive storage system.

15. The method of claim 11 wherein the received analog signal includes a plurality of data blocks and a plurality of sinusoidal preambles, one of said plurality of sinusoidal preambles received prior to reception of each data block.

16. A DC offset control loop comprising:

a summing junction having a first input and a second input and an output, said first input connected to analog signal processing elements;

an analog to digital converter, having an input and an output, said analog to digital converter input connected to said output of said summing junction;

a first memory circuit having a first memory input connected to said output of said analog to digital converter and a first memory output;

a second memory having a second memory input connected to the first memory output and a second memory output, a first adder circuit having an input and an output, said first adder input connected to said second memory output and to said first memory input;

a multiplier circuit having a multiplicand input connected to said output of said first adder circuit, a multiplier input connected to a source of a predetermined multiplier value, and an output;

an accumulator circuit having an input connected to said output of said multiplier circuit and an output; and a digital to analog converter having an input connected to said output of said integrator circuit and an output connected to said second input of said summing junction.

17. The DC offset control loop of claim 16 wherein said accumulator circuit comprises an adder circuit and a memory circuit, said adder circuit having an input connected to said output of said multiplier circuit and an output connected to an input of said memory circuit, said memory circuit having its output fed back to said input of said adder circuit and connected to said input of said digital to analog converter.

18. The DC offset control loop of claim 16 wherein said loop is included within the read channel of a disk drive storage subsystem.

19. The DC offset control loop of claim 18 wherein said read channel of said disk drive further includes a timing control loop and a gain control loop, said DC offset control loop operating without affecting the response characteristics of said timing and said gain loops.

20. The DC offset control loop of claim 16 wherein said first, and second memory circuits and said accumulator circuit further include an enable input for holding said circuit outputs to a predetermined value.

21. The DC offset control loop of claim 16 further comprising counter means for counting a predetermined number of bit clock cycles before sending a signal to a switch means inserted into said DC offset control loop to remove said input from said accumulator circuit when opened.

22. The DC offset control loop of claim 16 wherein said first and second memory circuits receive a bit clock signal having a predetermined frequency.

23. The DC offset control loop of claim 21 wherein said accumulator circuit receives a clock signal equal to one-half said predetermined frequency of said bit clock rate.

24. In a disk storage drive a DC offset control loop comprising:

subtraction means for subtracting a DC offset adjustment signal from an analog input signal read from a recording surface of a magnetic recording disk, said input signal including a constant frequency preamble burst portion having a known period and a data portion, said subtraction means outputting a difference signal obtained from said subtraction;

sampling means connected to said subtraction means for sampling and quantizing said difference signal into digital sample values;

adder means for receiving said digital sample values and adding digital sample values which are opposite in sign as sampled to obtain a series of DC offset error values;

multiplier means for scaling said DC offset error values by a loop gain factor; and integrator means connected to said multiplier means for accumulating said scaled DC offset error values and outputting an DC offset correction value to a digital to analog converter, said digital to analog converter receiving said output from said integrator means and generating said DC offset adjustment signal input to said subtraction means.

25. The DC offset control loop of claim 24 wherein said integrator means comprises an accumulator circuit including an adder circuit and a memory circuit, said adder circuit connected to an input of said memory circuit, said memory circuit having an output fed back to said input of said adder circuit.

26. The DC offset control loop of claim 24 further comprising enable means for initiating control loop operations.

27. The DC offset control loop of claim 24 wherein said integrator means integrates every other one of said scaled DC offset error values.

28. The DC offset control loop of claim 24 wherein said sampling means and said adder means receive a bit clock signal having a predetermined frequency.

29. The DC offset control loop of claim 26 further comprising means for disabling said integrator means after a predetermined number of bit clock cycles has been reached.

30. In a disk storage drive a DC offset control loop comprising:

a summing junction having a first input, a second input and an output, the first input being connected to analog signal processing elements of a read channel within the disk storage drive, an analog to digital converter, having an input connected to said sampling circuit for sampling a known frequency portion of an analog signal read back from a data storage disk and received from said summing junction for determining a series of intermediate DC offset correction values;

a first memory circuit having a first memory input connected to said output of said analog to digital converter and having a first memory output;

a second memory circuit having an input connected to the first memory output and having a second memory output;

an adder circuit having an adder input and an adder output for providing a series of DC offset error values, said adder input being connected to said second memory output and said first memory input;

a digital to analog converter having an input connected to said adder output, and having an output connected to a feedback signal path extending to said second input of said summing junction, for converting said series of DC offset error values into an analog control signal; and, an integrator circuit connected in said feedback signal path for integrating over a first predetermined time interval the analog control signal put out by said digital to analog converter, for holding the integrated analog control signal during a second predetermined time interval and for supplying an integrated DC offset error value to the second input of the summing junction during at least the second predetermined time interval.

\* \* \* \* \*